United States Patent
Jojic et al.

(10) Patent No.: US 6,701,016 B1
(45) Date of Patent: Mar. 2, 2004

(54) METHOD OF LEARNING DEFORMATION MODELS TO FACILITATE PATTERN MATCHING

(75) Inventors: Nebojsa Jojic, Redmond, WA (US); Patrice Simard, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 574 days.

(21) Appl. No.: 09/747,885

(22) Filed: Dec. 22, 2000

(51) Int. Cl.$^7$ ................................................. G06K 9/62

(52) U.S. Cl. ..................... 382/209; 382/228; 382/252; 382/277; 382/280; 382/293

(58) Field of Search ................................ 382/160, 209, 382/215, 217–220, 224–225, 227–228, 248–253, 276–280, 293–298

(56) References Cited

U.S. PATENT DOCUMENTS

| | | | | |
|---|---|---|---|---|
| 6,005,978 A | * | 12/1999 | Garakani | 382/218 |
| RE36,679 E | * | 5/2000 | Zakhor et al. | 324/312 |
| 6,157,747 A | * | 12/2000 | Szeliski et al. | 382/284 |
| 6,373,998 B2 | * | 4/2002 | Thirion et al. | 382/294 |
| 6,525,735 B1 | * | 2/2003 | Maillot | 345/473 |

OTHER PUBLICATIONS

Frey, B., et al.; *"Estimating Mixture Models of Images and Inferring Spatial Transformation Using the EM Algorithm"*, IEEE Conference on Computer Vision and Pattern Recognition, Ft. Collins, CO, Jun. 1999 (7 pages).

Frey, B., et al.; *"Learning Graphical Models of Images, Videos and Their Spatial Transformations"*, Proceedings of the Sixteenth Conference on Uncertainity in Artificial Intelligence, UAI 2000, (8 pages).

Jojic, N., et al.; *"Topographic Transformation as a Discrete Latent Variable"*, Algorithms and Architectures, NIP99, ( 7 pages).

Peng, J., et al.; *"Local Discriminative Learning for Pattern Recognition"*, Pattern Recognition, vol. 34, 2001, p. 139–150.

Pittore, M., et al.; *"Learning to Recognize Visual Dynamic Events from Examples"*, International Journal of Computer Vision, vol. 38, No. 1, p. 35–44 (2000).

Yang, F., et al.; *"New Image Filtering Technique Combining a Wavelet Transform with a Linear Network: Application to Face Recognition"*, Optical Engineering, vol. 39, No. 11, p. 2894–2899 (Nov. 2000).

(List continued on next page.)

*Primary Examiner*—Bhavesh M. Mehta
*Assistant Examiner*—Gregory Desire
(74) *Attorney, Agent, or Firm*—Amin & Turocy, LLP

(57) ABSTRACT

A model characterizes an error pattern that is functionally related to first and second patterns and to one or more model parameters, which may be unknown. The error pattern may be derived by deforming one or both of the first and second patterns, such as by applying a generally smooth, non-uniform deformation field. A likelihood for the model that the error pattern is zero, given the second pattern, is determined. If the model parameter(s) is unknown, the likelihood may be used to estimate (or infer) the parameter(s) that tend to maximize the likelihood for a plurality of stored patterns. The estimated parameters may, in turn, be employed to determine the likelihood as a measure of similarity between an observed pattern and the patterns that the model is capable of generating. In addition, the likelihood may be used to classify an observed pattern according to the likelihood that the observed pattern has relative to one or more models.

32 Claims, 7 Drawing Sheets

OTHER PUBLICATIONS

Chen YS, et al.; "A Conceptual Development Framework for Intuitive Human Pattern Recognition", Journal of the Chinese Institute of Engineers, vol. 23, No. 6, p. 767–779 (2000).

Echanobe J, et al.; "Deformed Systems for Contextual Post-processing", Fuzzy Sets and Systems, vol. 96, No. 3, p. 335–341 (1998).

Jian Huang Lai, et al.; "Face Recognition Using Holistic Fourier Invariant Features", Pattern Recognition, p. 95–109 (2001).

Katayama, T., et al.; "Optical Pattern Recognition Experiments of Walsh Spatial Frequency Domain Filtering Method", Japanese Journal of Applied Physics Part 1–Regular Papers Short Notes & Review Papers, vol. 39, No. 3B, p 1576–1581 (Mar. 2000).

Kikuchi, M., et al.; "Pattern Recognition with Eye Movement: A Neural Network Model", Proceedings of the IEEE–INNS–ENNS International Joint Conference on Neural Networks. IJCNN 2000. Neural Computing: New Challenges and Perspectives for the New Millenium, vol. 2, p. 37–40 (2000).

* cited by examiner

METHOD OF LEARNING DEFORMATION MODELS TO FACILITATE PATTERN MATCHING

TECHNICAL FIELD

The present invention relates to pattern recognition and, more particularly, to a method of learning templates and deformation models to facilitate pattern matching.

BACKGROUND OF THE INVENTION

Pattern recognition systems are employed in various areas of technology to help classify and/or match a test pattern relative to one or more known prototype patterns. Examples of pattern recognition applications include image analysis and classification, handwriting recognition, speech recognition, man and machine diagnostics, industrial inspection, medical imaging, etc.

In a pattern recognition system, it is common to store large amounts of data indicative of prototype patterns and compare them to a given example or unknown input symbol for identification. Several common algorithms may be utilized to compare or measure similarities between patterns such as K-nearest Neighbor (KNN), Parzen windows, and radial basis function (RBF). A level of similarity may be determined by generating a distance measure. By way of example, a simple algorithm for comparing two patterns f and g is to compute the Euclidean distance between them, such as may be expressed as:

$$d_E(f, g) = \sqrt{\sum_{x,y} (f(x, y) - g(x, y))^2} = \sqrt{(f-g)^2}$$

where $d_x$ denotes the Euclidean distance between two patterns, and f and g are assumed to be 2 dimensional patterns, indexed by x and y. An extension of the Euclidean distance methodology to other dimensions is straightforward.

The usefulness of the Euclidean distance algorithm is limited, however, because if f and g are not perfectly aligned, the Euclidean distance can yield arbitrarily large values. Consider, for instance, a case where g is a translated version of f, that is g(x, y)=f(x+1, y). In this case, the Euclidean distance could yield a very large value, even thought f and g may be virtually identical except for a small amount of translation in the x-direction.

One proposed comparison scheme to remedy the aforementioned shortcoming associated with the traditional Euclidean distance approach is to employ a tangent distance, such as is disclosed in U.S. Pat. No. 5,422,961. This comparison scheme is invariant with respect to a selected set of small transformations of the prototypes. The small transformations of interest are expressed by calculating a derivative of the transformed image with respect to the parameter that controls the transformation. The directional derivative is used to generate a computational representation of the transformation of interest. The transformation of interest, which corresponds to a desired invariance, can be efficiently expressed by using tangent vectors constructed relative to the surface of transformation. The tangent distance $d_T$ may be expressed as:

$$d_T(f, g)^2 = \min_{\alpha_f \alpha_g} (f + l_f a_f - g - l_g a_g)^2$$

where $L_f$ and $L_g$ are matrices of tangent vectors for f and g respectively, and $a_f$ and $a_g$ are vectors representing the amount of deformation along the tangent plane. An advantage of tangent distance compared to the traditional Euclidean distance approach is that the tangent distance is less affected by translation than the Euclidean distance because if $L_f$ and $L_g$ contain a linear approximation of the translation transformation, the tangent distance compares the translated version of f and g. The tangent distance concept is explored in greater detail in a paper entitled, "Efficient Pattern Recognition Using a New Transformation Distance," presented by Patrice Y. Simard, Yann LeCun and John Denker, Advances in Neural Information Processing Systems, Eds. Morgan Kaufmann, pp. 50–58, 1993.

A limitation of tangent distance approach, however, is that the transformations to which it is invariant generally must be known a-priori and precisely (e.g., translation, rotation, scaling, etc.). Moreover, tangent distance has no mechanism to specify loose constraints such as small elastic displacements. Such mechanism would be useful because in many cases, such as with speech or image patterns, it is not known which transformations should be used, but it is assumed that the problem exhibit some invariance with respect to small elastic displacements.

A desirable property of a pattern recognition machine is that its output be invariant with respect to certain small transformations of its input. That is, some transformations of a meaningful pattern, such as an alphanumeric symbol, will not affect the interpretation of the pattern by a human observer. A comparison scheme that is invariant to such transformations can operate with greater economy and speed than comparison schemes that require exhaustive sets of prototypes. By way of example, transformations of alphanumeric patterns that are of interest in this regard may include translation, rotation, scaling, hyperbolic deformations, line thickness changes, and gray-level changes. Any desired number of possible invariances can be included in any particular recognition process, provided that such invariances are known a priori, which is not always possible.

Many computer vision and image processing tasks benefit from invariances to spatial deformations in the image. Examples include handwritten character recognition, face recognition and motion estimation in video sequences. When the input images are subjected to possibly large transformations from a known finite set of transformations (e.g., translations in images), it is possible to model the transformations using a discrete latent variable and perform transformation-invariant clustering and dimensionality reduction using Expectation Maximization as in "Topographic transformation as a discrete latent variable" by Jojic and Frey presented at Neural Information Processing Systems (NIPS) 1999. Although this method produces excellent results on practical problems, the amount of computation grows linearly with the total number of possible transformations in the input.

A tangent-based construction of a deformation field may be used to model large deformations in an approximate manner. The tangent approximation can also be included in generative models, such as including linear factor analyzer models and nonlinear generative models. Another approach to modeling small deformations is to jointly cluster the data and learn a locally linear deformation model for each cluster, e.g., using expectation maximization in a factor analyzer as in "Modeling the manifolds of images of handwritten digits," by Hinton et al. published in IEEE Trans. on Neural Networks, 8, 65–74. With the factor analysis approach, however, a large amount of data is needed to accurately model the deformations. Learning also is susceptible to local optima that might confuse deformed data from one cluster with data from another cluster. That is, some factors tend to "erase" parts of the image and "draw" new parts, instead of just perturbing the image.

SUMMARY OF THE INVENTION

The present invention relates to a method for learning mixtures of smooth, non-uniform deformation models to facilitate pattern recognition or matching. A generative network is created to model one or more classes of patterns for use in determining a likelihood that a pattern matches patterns modeled by the network. The model is created to be invariant to non-uniform pattern deformation.

The model is developed to describe an error pattern as a difference between first and second patterns. In accordance with an aspect of the present invention, at least the first pattern is deformed by application of a deformation field. The deformation field may be a smooth, non-uniform field, such as may be constructed from low frequency wavelet basis vectors and associated deformation coefficients. Various parameters in the model describe a set of pattern prototypes and associated levels of noise. The parameters further control the amount of deformation and correlations among the deformations in different parts of the pattern. An error pattern thus may be generated from the model by sampling according to the probability distributions associated with different components of the model.

In accordance with an aspect of the present invention, joint and conditional likelihoods for the model may be evaluated. The model has a number of parameters that govern different probability distributions, and a number of intermediate variables that may not be observed in real applications. By way of example, the deformation coefficients are types of variables, for which a functional form of their probability distribution may be known, but the exact coefficients for each observed pattern may be unknown. To deal with the non-observed, or hidden variables, a joint likelihood of variables in the system, given the second pattern, is evaluated assuming that the error pattern equals zero. The joint likelihood may be employed to estimate (or infer) parameters of the model that tend to maximize the joint likelihood for stored patterns. After the parameters have been estimated, a likelihood of observing a zero error pattern, given the second pattern, may be computed, such as by integrating over hidden variables in the model. In essence, this produces a likelihood value as to whether the first pattern is in accordance with the model. The likelihood value may then be used in classification by evaluating models for different classes of patterns.

To properly integrate out the hidden variables, the parameters of the associated conditional distributions need to be known. However, the parameters are typically unknown, while there are a number of labeled patterns available to train the model. As a result, the model may be optimized in accordance with an aspect of the present invention. For example, hidden variables may be integrated out in an iterative process, such as by increasing the likelihood of all observed patterns in each iteration. In each iteration, the current parameter estimates are used to infer hidden variables from the joint likelihood, which, in turn, may be utilized to re-estimate the parameters. This iterative process may be repeated for patterns until the estimated parameters converge, thereby providing substantially optimized parameters for the model.

Provided that parameters of the model are known (or at least estimated from a training set), the joint likelihood that the error pattern equals zero, given the second pattern, further may be employed to classify new patterns in accordance with the present invention. The joint likelihood may be computed by averaging over the hidden variables, taking the dependencies among variables into account. The estimated parameters of the model serve to properly regularize the distance among patterns, and the integration technique rewards the patterns that are easier to reach with the generative model. For example, if an observed pattern is close to several prototype patterns, the likelihood computation will naturally reward such a pattern with greater likelihood than if the observed pattern is only remotely similar to one of the prototypes.

In accordance with another aspect of the present invention, the model may be designed also to deform the second pattern. For example, a deformation field having deformation coefficients may be applied to form a deformation component that is added to the second patter to derive a second deformed pattern. In a case where the second pattern is deformed, the deformation coefficients of for the second pattern may be correlated with the deformation coefficients for the first pattern, such as being substantially opposite. A covariance matrix parameter further may be selected to capture a desired level of correlation between the respective deformation coefficients for the first and second patterns. Consequently, the resulting error pattern is the difference between the deformed first pattern and the deformed second pattern.

Another aspect of the present invention provides a method for learning mixtures of models to facilitate pattern recognition. The method includes providing a model having model parameters, the model characterizing an error pattern functionally related to a difference between two patterns. At least a first of the two patterns is deformed by application of an associated substantially smooth and non-uniform deformation field. A joint likelihood in the model is determined relative to the model parameters, given a stored pattern, assuming that the error pattern equals zero. The model parameters that tend to maximize the joint likelihood for a plurality of stored patterns are determined. The methodology may, in accordance with an aspect of the present invention, be implemented as computer-executable instructions in a computer-readable medium.

Yet another aspect of the present invention provides a method for generating a model to facilitate pattern recognition. An error pattern is modeled based on a first pattern relative to a second pattern, at least the first pattern being deformed by application of a substantially smooth deformation field. The model has at least one parameter for characterizing a set of pattern prototypes and associated noise levels and for controlling deformation of the first pattern. A likelihood that an error pattern is zero, given the second pattern, is characterized. The error pattern is functionally related to the first pattern, the second pattern, and the parameter. The parameter is estimated so as to tend to maximize the likelihood for a plurality of stored second patterns. The methodology may, in accordance with an aspect of the present invention, be implemented as computer-executable instructions in a computer-readable medium.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

NOTATION

Figure 1:
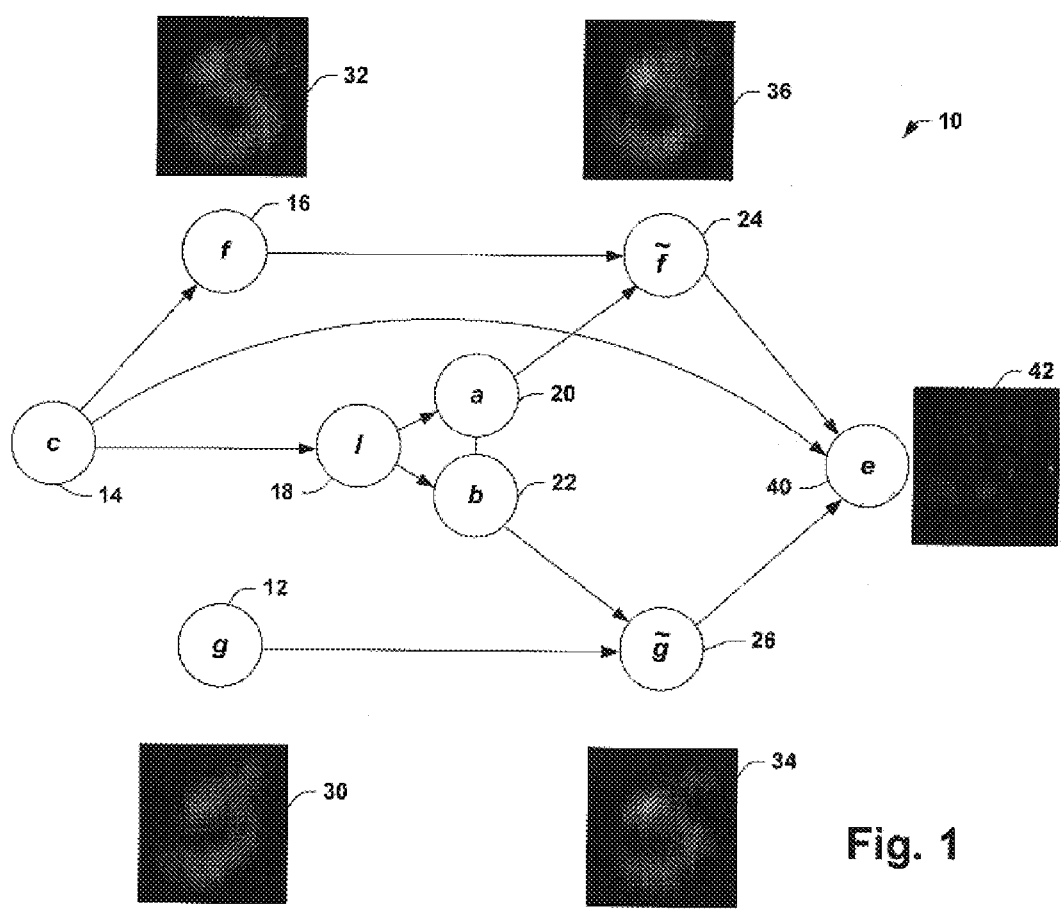
FIG. 1 is an example of a Bayesian network for modeling a pattern matching system in accordance with the present invention.

The present system can be used for patterns of arbitrary dimensionality that exhibit some type of spatial coherence during deformation. In other words, it is believed that the inherent dimensionality of the deformation is substantially smaller than that of a pattern, due to the fact that the deformation cannot change considerably among the neighboring parts of the pattern. In case of images, for example, if the part in a lower right corner is compressed, it is not likely that the part right above it will be considerably expanded. The deformations in images are usually smooth. Having said that, it also should be note that regardless of the dimensionality of the pattern, the notation is considerably simplified if the patterns are represented as vectors of values. In case of M×N images, for example, which are inherently two-dimensional, the images can be unwrapped into a long vector by stacking M-long image columns on top of each other (in fact, this is how the matrices of any dimensionality are typically stored in memory ). This will result in a vector with M*N elements. We will denote the pattern vectors with bold face lower case letters, such as f and g. By way of illustration, in case of images, the number of elements in these vectors is equal to the total number of pixels in the image, and in case of speech/audio patterns, the number of elements is equal to the number of samples or frames in the time window. This simplification in notation allows describing operators acting on patterns of arbitrary dimensionality to be characterized by two-dimensional matrices and the use of simple linear algebra for derivations.

For example, in case of an image pattern f, an approximate derivative in Y direction could be the matrix $$G_y = \begin{matrix} & 1 & 2 & 3... & & & M & M+1 & ... & MN & \\ & 1 & -1 & 0 & 0 & 0 & ... & 0 & 0 & 0 & 0 & ... & 0 & 1 \\ & 0 & 1 & -1 & 0 & 0 & ... & 0 & 0 & 0 & 0 & ... & 0 & 2 \\ & ... & & & & & & & & & & & & ... \\ & 0 & 0 & 0 & 0 & 0 & ... & 0 & 1 & -1 & 0 & ... & 0 & M+1 \\ & ... & & & & & & & & & & & & \\ & 0 & 0 & ... & & & & & & & & & 1 & MN \end{matrix}$$

The letters in the first row denote the column and the letters in the last column denote the rows of the matrix. In this example, the derivative is approximated by the difference between the pixel and its immediate neighbor. This is accomplished by placing 1 and −1 in the appropriate places in each row. Since the image is represented as a long vector, care has to be taken at the $M^{th}$ row of G since the appropriate pixel does not have the neighbor (edge of the image). Then a spatial derivative can be computed by multiplying the pattern f with the matrix $G_x$.

When we take the derivative in the other direction, however, 1 and −1 values have to be M entries apart since the neighbor in x direction is in the next column of an image, which is equivalent to being M entries apart in the vector representation:

$$G_y = \begin{matrix} & 1 & 2 & 3... & & & M & M+1 & ... & MN & \\ & 1 & 0 & 0 & 0 & 0 & ... & 0 & -1 & 0 & 0 & ... & 0 & 1 \\ & 0 & 1 & 0 & 0 & 0 & ... & 0 & 0 & -1 & 0 & ... & 0 & 2 \\ & ... & & & & & & & & & & & & ... \\ & ... & & & & & & & & & & & & \\ & 0 & 0 & ... & & & & & & & & & 1 & MN \end{matrix}$$

Note, however, that other derivative approximations can be described in similar way. It is to be understood and appreciated that the above matrices have been provided for purposes of illustration only, and the scope of this application is not limited to these particular approximations. Those skilled in the art will understand and appreciate that other approximations could be utilized in accordance with an aspect of the present invention.

This illustrates that vector representation of the patterns allows linear operations, even when they deal with different dimensions of the pattern, to be expressed by matrix multiplications and thus all variables in our notation are at most two-dimensional.

To make it easier to track the dimensionality of different terms in equations presented in the following description, lower case letters represent scalars (distance d, for example), bold-face lower-case letters represent vectors (such as a pattern f, or a vector of deformation coefficients a) and bold-face capital letters represent matrices, such as the above difference operators $G_x$ and $G_y$.

DETAILED DESCRIPTION OF THE INVENTION

The present invention provides a system and method operable to jointly cluster data and learn mixtures of non-uniform, smooth deformation fields to facilitate pattern recognition or matching. The model further may be employed to classify patterns by evaluating models for different classes of patterns. In the following description, for purposes of explanation, certain details are set forth in order to provide a thorough understanding of the present invention. It will be evident to one skilled in the art, however, that the present invention may be practiced without these specific details. In other instances, well-known structures and functional aspects are shown and described in block diagram form in order to facilitate description of the present invention. Those skilled in the art will understand and appreciate various ways to implement such examples, all of which are contemplated as being within the scope of the present invention.

By way of introduction, many pattern recognition and pattern processing systems, such as for images, audio, and other signal processing tasks, benefit from invariances to spatial deformations in the image. Examples include handwritten character recognition, face recognition, audio pattern (e.g., speech) recognition and motion estimation in video sequences. When an input pattern is subjected to possibly large transformations from a known finite set of transformations (e.g., translations in images), it is possible to model the transformations using a discrete latent variable and perform transformation-invariant clustering and dimensionality reduction using Expectation Maximization. Although this method may produce satisfactory results on practical problems, the amount of computation grows linearly with the total number of possible transformations in the input.

In certain cases, the deformations may be assumed relatively small, such as due to dense temporal sampling of a video sequence, from blurring the input, because of well-behaved handwriters, etc. By way of illustration, suppose $(d_x, d_y)$ is a deformation field for an image pattern (a vector field that specifies where to shift pixel intensity), where $(d_{xi}, d_{yi})$ is the two-dimensional real vector associated with pixel i. Given a vector of pixel intensities f for an image, and assuming the deformation vectors are small, the deformed image may be approximated by $$\tilde{f} = f + \frac{\partial f}{\partial x} \circ \delta_x + \frac{\partial f}{\partial y} \circ \delta_y \qquad \text{(Eq. 1)}$$

where "$\circ$" denotes an element-wise product and $\partial f/\partial x$ is a gradient image computed by shifting the original image to the right a small amount and then subtracting off the original image. Suppose, for example, that $d_y=0$ and $d_x=a1$, where a is a scalar. Then, the image deforms by shifting to the right by an amount proportional to the vector a.

One type of deformation field that has been proposed is a linear combination of uniform deformation fields for translation, rotation, scaling and shearing plus the non-uniform field for line thickness. See Simard et al., Efficient Pattern Recognition Using a New Transformation Distance. S. J. Hanson, J. D. Cowan and C. L. Giles, Advances in Neural Information Processing Systems 5, Morgan Kaufman (1993). When the deformation field is parameterized by a scalar a (e.g., x-translation), $$\frac{\partial f}{\partial x} \circ d_x + \frac{\partial f}{\partial y} \circ d_y$$

can be viewed as the gradient off with respect to a. Since the above approximation holds for small a, this gradient is tangent to the true 1-D deformation manifold of f.

Eq. 1 provides a base for creating a model, in accordance with an aspect of the present invention, which may be utilized to measure similarity between patterns f and g. For purposes of simplicity of explanation, the patterns f and g will be described as being images, although it is to be understood and appreciated that the present invention is equally applicable to other types of patterns. For example, the patterns may be audio patterns, radio frequency patterns, patterns of electromagnetic energy, etc. Each of the image patterns f and g is an N-dimensional vector (where N is a positive integer) of a digital image in, for example, pixel space having x and y components. Those skilled in the art also will understand and appreciate that the principles described below may be extended to numerous applications, such as video coding, motion estimation, optical character recognition, speech recognition, and video mosaic, to name a few.

In accordance with an aspect of the present invention, a deformation field $(d_x, d_y)$ is constructed a non-uniform field that is parameterized by smooth functional basis vectors having associated deformation coefficients. The functional basis may be an inverse wavelet transform, a fast Fourier transform, or other suitable transform (e.g., sine or cosine) operable to provide a substantially smooth deformation field. For purposes of brevity, the following description describes the functional basis vectors as wavelet basis vectors, such as low frequency wavelet basis vectors. The deformation field may be expressed in its component parts as $$d_x = R_x a_x, \qquad \text{(Eq. 2)}$$

$$d_y = R_y a_y,$$

where the columns of R contain low-frequency wavelet basis vectors $(R_x, R_y)$, and $$a = \begin{bmatrix} a_x \\ a_y \end{bmatrix}$$

are the deformation coefficients. It should be noted, that the number of basis functions is considerably smaller than the dimensionality of the vector describing the pattern (the total number of pixels in the image), and thus the deformation, which consists of as many values as the pattern, may be described by a considerably smaller number of deformation coefficients.

An advantage of wavelets is their space/frequency localization. For example, low-frequency deformation coefficients may be selected to capture global trends in the pattern(s) being recognized, such as by utilizing a number of deformation coefficients that is a small fraction of the number of pixels in the image f. The deformations localized in smaller regions of the image can be expressed by more spatially localized (e.g., higher frequency) wavelets. The deformed image $\tilde{f}$ may be expressed as a linear approximation as $$\tilde{f}=f+(G_x f)^t \circ (R a_x)+(G_y f) \circ (R a_y), \qquad \text{(Eq. 3)}$$

where the derivatives in Eq. 1 are approximated by sparse matrices $G_x$ and $G_y$ that operate on f to compute finite spatial differences in the image pattern.

It is to be appreciated that Eq. 3 is bilinear in the deformation coefficients $(a_x, a_y)$ and in the original image f That is, Eq. 3 is linear in f given a and it is linear in a given f. The element-wise product thus may be rewritten as a matrix product, such as by converting either the vector Gf or the vector Ra to a diagonal matrix using the diag( ) function:

$$\tilde{f}=f+D(f)a, \text{ where } D(f)=[\text{diag}(G_x f)R \text{ diag}(G_y f)R] \qquad \text{(Eq. 4)}$$

$$\tilde{f}=T(a), \text{ where } T(a)=I+\text{diag}(Ra_x)G_x+\text{diag}(Ra_y)G_y. \qquad \text{(Eq. 5)}$$

It is to be appreciated that Eq. 4 appears as a typical linear model, such as in factor analysis or principal component analysis. It should be noted, however, that the components in this case need not be estimated, as they are based on the deformation model D(f). Thus, the number of parameters is considerably smaller.

Eq. 4 shows by applying a simple pseudo inverse, the coefficients of the image deformation that transforms f into f̂ may be estimated:

$$a = D(f)^{-1}(\hat{f}-f). \tag{Eq. 6}$$

The low-dimensional vector of deformation coefficients provided by Eq. 6 minimizes the distance $\|f-\hat{f}\|$. Under easily satisfied conditions on the differencing matrices $G_x$ and $G_y$, T(a) in Eq. 5 can be made invertible regardless of the image f, so that $f = T(a)^{-1} \hat{f}$.

Given a test (or prototype) image g, the image f may be matched relative to g by computing the deformation coefficients, $a = D(f)^{-1} (g-f)$, that minimize $\|f-g\|$. In accordance with another aspect of the present invention the image g, which may be an N-dimensional vector of a digital image in the same space as the imager, also may be deformed. This enables more extreme deformations to be successfully matched in accordance with the present invention.

The deformation of the image g may occur in substantially the same manner as described above with respect to the image f. By way of example, the deformation field is applied to the image g. The deformation field, for example, is a substantially smooth deformation field constructed from low frequency wavelet basis vectors $R_x$ and $R_y$ and associated deformation coefficients $b_x$ and $b_y$. The component parts of the deformation field may be expressed as $$d_x = R_x b_x, \tag{Eq. 7}$$
$$d_y = R_y b_y,$$

where ($R_x$, $R_y$) are the wavelet basis vectors, and $$b = \begin{bmatrix} b_x \\ b_y \end{bmatrix}$$

are the deformation coefficients. It is to be understood and appreciated that, in many applications, it may be desirable to make $R_x$ and $R_y$ the same for the two patterns f and g, e.g. $R_x = R_y = R$.

The deformation field ($d_x$, $d_y$) is applied to a spatial derivative of the image g to form a deformation component that is added to g to form a deformed image. The deformed image for the image g thus may be represented as $$\tilde{g} = g + (G_x g) \circ (R b_x) + (G_y g) \circ (R b_y), \tag{Eq. 8}$$

where $G_x$ and $G_y$ are linear approximations of the spatial derivatives of the image g provided by the partial derivative functions.

As described above with respect to Eq. 4, the deformed image $\tilde{g}$ may in turn be represented as:

$$\tilde{g} = g + D(g)b, \text{ where } D(g) = [\text{diag}(G_x g) R \text{ diag}(G_y g) R] \tag{Eq. 9}$$

From Eqs. 4 and 9 the difference between the deformed images $\tilde{f}$ and $\tilde{g}$ is $$\tilde{f} - \tilde{g} = f - g + [D(f) \ -D(g)] \begin{bmatrix} a \\ b \end{bmatrix} \tag{Eq. 10}$$

It is to be appreciated that the distance $\|\tilde{f}-\tilde{g}\|$ could be minimized by standard methods, such as quadratic optimization with respect to the deformation coefficients a and b.

In accordance with an aspect of the present invention, one or more cost functions may be employed to capture correlations between different pixels in the respective images f and g and/or to favor some deformation fields over others. This results in a versatile distance between the image patterns f and g indicative of a measure of the similarity between the patterns (e.g., the distance therebetween), which may be expressed as $$D(f,g)^2 = \min_{a,b} \left\{ (\tilde{f}-\tilde{g})^T \Psi^{-1} (\tilde{f}-\tilde{g}) + [a^T \ b^T] \Gamma^{-1} \begin{bmatrix} a \\ b \end{bmatrix} \right\} \tag{Eq. 11}$$

By way of example, the cost parameter $\Psi$ is a diagonal matrix whose non-zero elements contain variances of appropriate pixels to enable different pixels to have different levels of importance for purposes of matching. The diagonal matrix $\Psi$ may be hand crafted to non-uniformly weight the importance of each pixel so that more important aspects of a pattern may be weighted more heavily in the pattern recognition process. For example, if the images f and g are images of a tree in the wind, the deformation coefficients should be capable of aligning the main portions of the image, such as may include the trunk and large branches, while the variability in the appearance of the leaves (e.g., higher resolution attributes) may be captured in the cost term $\Psi$.

On the other hand, G is a full covariance matrix operable to capture correlation between the deformation coefficients a and b of the allowed deformations. The covariant matrix G is applied to the deformation coefficients a and b to constrain the deformation of the images f and g. This cost term G allows capturing correlations among the deformation coefficients. For instance, if the major component of a deformation is a rotation around the center, then the displacements in x and y directions are strongly correlated. Similarly, when deforming both images, it is likely that the deformation coefficients for the two images are anti-correlated, e.g., one is deforming in the opposite direction of the other, so that the minimal deformation is necessary in both images. Those familiar with statistics and covariance matrices can easily construct matrices that produce cost terms that are lower when these types of correlations are present in the deformation coefficients. While in theory, similar correlations can be captured directly in the pixel domain, such as in the cost term involving $\Psi$, in practice it is difficult to incorporate these due to high dimensionality of the data. Accordingly, it is easier to utilize a diagonal matrix that decouples the effects of different pixels in the appropriate cost term. In contrast, the number of deformation coefficients in vectors a and b are small enough to make it possible to use non-diagonal structures that capture correlations as we discussed.

Turning now to FIG. 1, a Bayesian network 10 is illustrated that may be employed to compute a likelihood that input patterns match the patterns modeled by the network in accordance with an aspect of the present invention. For classification, one of these networks 10 is learned for each class of data. The model 10 described below corresponds to the relationship set forth with respect to Eq. 11.

The model is generated by clamping a test image g, indicated at 12. Then, an image cluster index c, indicated at 14, is selected from P(c). Given c, a latent image f, indicated at 16, is then drawn from a Gaussian distribution of the form, $$N(f, \mu_c, \phi_c) = k e^{-(f-\mu_c)^T \phi_c^{-1} (f-\mu_c)} \tag{Eq. 12}$$

where k is a constant for the Gaussian function, $\mu_c$ is a mean of the Gaussian function and $F_c$ is its (diagonal)

covariance matrix. It may be possible to assume that for a particular value of c, $F_c=0$, so $p(f|c)=d(f-\mu_c)$, where d denotes a Dirac (impulse) function that is nonzero only when $f=\mu_c$. This assumption allows the use of exact EM for learning the parameters of the model.

The modeling proceeds by selecting a deformation type index l indicated at 18, according to $p(l|c)$. The index l determines a covariance matrix $?_l$ of deformation coefficients a and b for both the latent image f and the test image g, respectively:

$$p\left(\begin{bmatrix} a \\ b \end{bmatrix} \middle| l\right) = N\left(\begin{bmatrix} a \\ b \end{bmatrix}; 0; \Gamma_l\right) \quad \text{(Eq. 13)}$$

$?_l$, for example, could be a diagonal matrix with larger elements corresponding to lower-frequency basis functions, to capture a wide range of smooth, non-uniform deformations. However, $?_l$ could also capture correlations among deformations in different parts of the pattern. In accordance with an aspect of the present invention, the deformation coefficients a for the latent pattern f and the coefficients b for the observed pattern g should be strongly correlated. Consequently, the joint distribution of the deformation coefficients may be modeled instead of modeling a and b separately. The correlation between a and b is schematically represented by the connection between deformation elements 20 and 22.

Alternatively, the model also may be generated to describe a situation where only one of the patterns f or g is deformed in accordance with an aspect of the present invention. Those skilled in the art will understand and appreciate that the equations set forth herein would be modified accordingly to reflect only one set of deformation coefficients. However, to accommodate more pronounced transformations, both images may be deformed. For purposes of brevity, the following example relates to a model where both patterns f and g are deformed.

By way of illustration, assuming that both patterns have identical displacement basis functions, the deformation coefficients of the image f may be set to be substantially the opposite of the deformation coefficient of the image g (e.g., a–b). By placing such a requirement on the deformation coefficients, it will be appreciated that the images f and g will tend to deform toward each other, helping to minimize the distance between the resulting deformed images f̃ and g̃. In addition, the size of the optimization problem may be reduced and the allowable deformations may be further constrained.

Once the deformation coefficients a, b have been generated at 20 and 22, respectively, a deformed latent pattern f̃, indicated at 24, and a deformed prototype pattern g̃, indicated at 26, are produced from f and g according to Eqs. 3 and 8. Using the functions D( ) and T( ) introduced above with respect to Eqs. 4, 5, and 9, we have $$p(\tilde{f}|f, a) = d(\tilde{f}-f-D(f)a) = d(\tilde{f}-T(a)f), \quad \text{(Eq. 14)}$$

$$p(\tilde{g}|g, b) = d(\tilde{g}-g-D(g)b) = d(\tilde{g}-T(b)g) \quad \text{(Eq. 15)}$$

For purposes of illustration, examples of image patterns 30 and 32 have been position adjacent the respective patterns 12 and 16. While the particular image patterns 30 and 32 represent characters in the selected class c, those skilled in the art will understand and appreciate that the model 10 is equally applicable to other types of images as well as to other types of patterns. Each image pattern 30, 32 is deformed to produce a respective deformed image, illustrated respectively as 34, 36. As mentioned above, the deformed images 34 and 36 are derived by application of associated deformation fields to the image patterns 30 and 32. In particular, a deformation field having the coefficients 20 is applied to the image 32 to produce the image pattern 36. Similarly, another deformation field having the coefficients 22 is applied to the image pattern 30 to produce the deformed pattern shown at 34.

Figure 2:
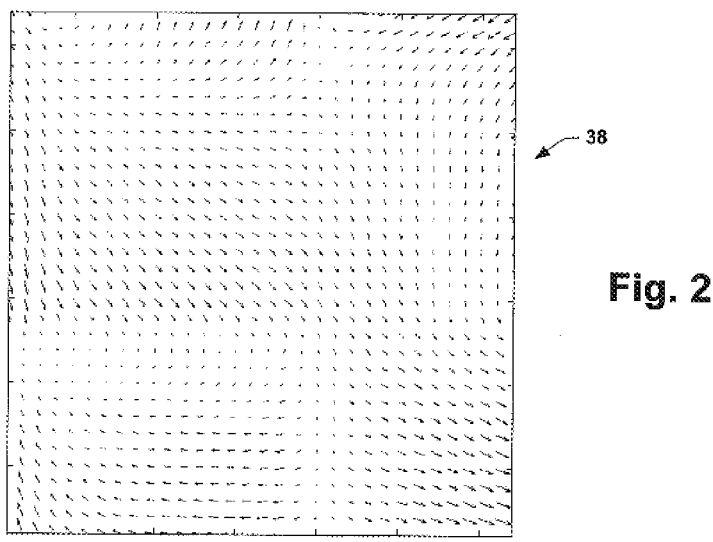
FIG. 2 is an example of a deformation field in accordance with the present invention.

FIG. 2 illustrates an example of a smooth, non-uniform deformation field 38, which may be employed in accordance with an aspect of the present invention. The example of the deformation field 38 corresponds to both x and y components that may be applied to deform a respective pattern in two dimensions (e.g., an image in pixel space). Those skilled in the art will understand and appreciated that a deformation field, in accordance with present invention, may be extended to patterns having a lesser or greater number of dimensions.

Figure 3:
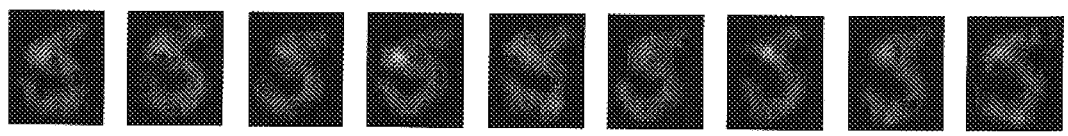
FIG. 3 illustrates examples of resulting images from application of different deformation fields to an image.

As an illustration of the generative process up to this point, FIG. 3 illustrates several image patterns produced by randomly selecting eight deformation coefficients from a unit-covariance Gaussian and applying the resulting deformation field to an image pattern, such as either pattern 30 or 32 (FIG. 1).

Referring back to FIG. 1, the last random variable in the model 10 is an error pattern e (called a "reference signal" in control theory), indicated at 40. An example of an error pattern e based on the image patterns 34 and 36 is illustrated as 42. The error pattern 40 may be formed, for example, by adding a small amount diagonal Gaussian noise to the difference between the deformed images f̃ and g̃:

$$p(e|\tilde{f}, \tilde{g}, c) = N(e; \tilde{f}-\tilde{g}, ?_c) \quad \text{(Eq. 16)}$$

For relatively good model parameters, it is likely that one of the cluster means can be slightly deformed to match a slightly deformed observed pattern. However, due to the constrained nature of the deformations, an exact match may not be achievable. Thus, to facilitate an exact match, the model 10 helps the pattern difference with a small amount of non-uniform, cluster dependent noise, represented as $?_c$. For the example where the patterns f and g are image patterns, the term $?_c$ may be a diagonal matrix whose non-zero elements contain the pixel variances. A natural place to include cluster dependence is in the cluster noise parameter $F_c$, such as in Eq. 12. If the model 10 is constructed such that the cluster noise $F_c$ is collapsed to zero, cluster dependency may be added into the $?_c$ parameter.

Figure 4:
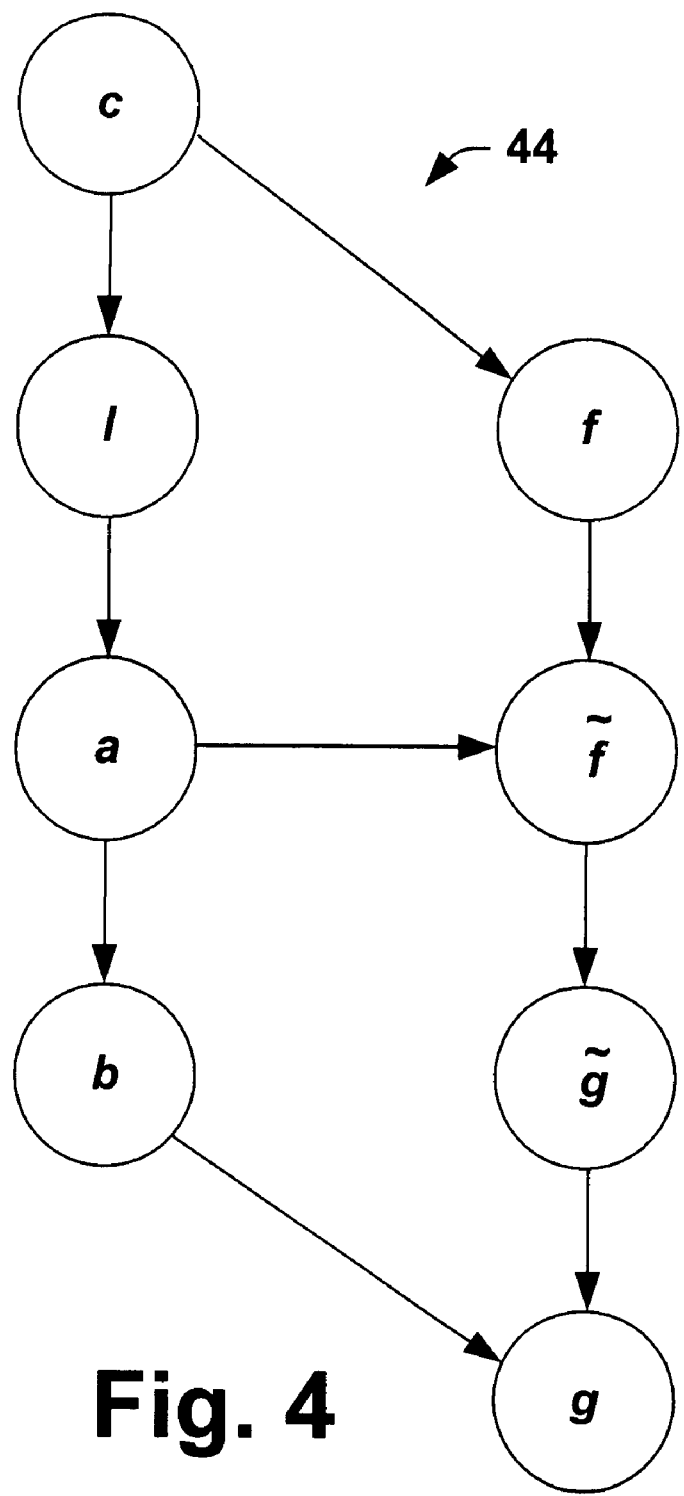
FIG. 4 is an example of a generative network derived from the network of FIG. 1 in accordance with the present invention.

As described above, FIG. 1 illustrated an example of sampling from the model 10 that resulted in an error pattern fairly close to a zero pattern. By sampling from the model, however, one will not always be fortunate to achieve such a result. However, the mathematical model in the previous equations can be used to evaluate how likely it is to achieve a zero error pattern e by randomly selecting hidden variables conditioned on their parents in accordance with an aspect of the present invention. If the model 10 has the right cluster means, right noise levels, and the right variability in the deformation coefficients a and b, then the likelihood p(e=0|g) will be high. Thus, this likelihood can be used for classification of patterns when the parameters of the models for different classes are known. Also, an EM algorithm may be utilized to estimate the parameters of the model 10 that tend to maximize this likelihood for all observed images in a training data set. A subtle point is that by conditioning on e=0, we can transform the network 10 of FIG. 1 into a generative network 44, such as shown in FIG. 4, for those who find maximizing the likelihood of the data more principled than maximizing the likelihood of matching the data.

After collapsing the deterministic nodes in the network, the joint distribution conditioned on the input g may be expressed as $$p(c, l, a, b, e|g) = P_{c,l} N\left(\begin{bmatrix} a \\ b \end{bmatrix}; 0; ?\right) \quad \text{(Eq. 17)}$$

$$N(e; \mu_c + D(\mu_c)a - g - D(g)b, ?_c)$$

By integrating out the deformation coefficients a and b Eq. 17 becomes $$p(c,l, e|g) = P_{c,l} N(e; \mu_c - g, [?_c^{-1} - ?_c^{-1} M_c O_{c,l} M ?_c^{-1}]^{-1}), \quad \text{(Eq. 18)}$$

where $M_c = [D(\mu_c) - D(g)]$ and $O_{c,l} = (?^{-1} + M ?_c ?_c^{-1} M_c)^{-1}$. This density function can be normalized over c, l to obtain P(c, l|e, g). The likelihood can be computed by summing over the class and transformation indices:

$$p(e|g) = \sum_{c=1}^{C} \sum_{l=1}^{L} P_{c,l} N(e; \mu_c - g, [?_c^{-1} - ?_c^{-1} M_c O_{c,l} M ?_c^{-1}]^{-1}). \quad \text{(Eq. 19)}$$

By using this likelihood instead of the distance measure given by Eq. 10, we are integrating over all possible deformations instead of finding an optimal deformation, such as provided by Eq. 27. As a result, the interdependencies of the model parameters are incorporated into the model.

If we have a number of examples of patterns g, in a training set (where t=1, . . . , T) that our model should capture, the likelihood of being able to match the whole set of patterns may be defined as:

$$p(e_t = 0, t = 1, \ldots, T|g_t, t = 1, \ldots, T) = \prod_{t=1}^{T} p(e_t = 0|g) \quad \text{(Eq. 20)}$$

The likelihood provided by Eq. 20 assumes that the patterns g in the training set are independent, which is usually true for OCR or image retrieval applications. If this is not the case, such as for analysis of deformations in a video sequence, those skilled in the art will understand and appreciate that Eq. 20 should be extended to include the transition of deformation between successive frames. Having defined the likelihood of a training set in Eq. 20, the model may be optimized by employing the likelihood as a function of model parameters that need to be maximized. While almost any optimization technique could be used, in accordance with an aspect of the present invention, the following example is described with respect to the technique called expectation maximization (EM). EM is well suited for optimizing graphical models with hidden variables, such as the pattern matching network 10 (FIG. 1).

The EM technique consists of iteratively computing a new set of parameters (M step) and then recomputing the expectations based on the updated parameters (E step) until the likelihood in Eq. 20 stops changing significantly. This technique is known to consistently increase the likelihood of the training data.

The EM algorithm is based on the usual optimization criterion of setting the derivative of the joint likelihood with respect to a model parameter θ to zero. This derivative can be expressed as:

$$\frac{\partial p(e_1, \ldots, e_T | g_1, \ldots, g_T)}{\partial \theta} = \sum_{t=1}^{T} E\left[\frac{\partial}{\partial \theta} \log p(c, l, a, b, e|g)|e\right] \quad \text{(Eq. 21)}$$

To derive the M-step, the above expression is equated to zero and solved in model parameters by fixing the expectations. The expectations may be computed using previous estimates of the model parameters. However, solving for these parameters in M-step in general changes them and thus requires re-computation of the expectations.

In the first iteration, the model parameters may be arbitrarily selected (e.g., the cluster means could be set to noisy versions of the mean of all patterns, and the covariance matrices could all be set to the identity matrix). Then, using the selected parameters, expectations are computed in an E-step and, in turn, used to solve the equations in the M-step for new model parameters. These two steps are iterated until convergence is reached. The EM algorithm has been shown to increase the likelihood of the data in each iteration.

Those skilled in the art will understand and appreciate that the EM algorithm is well known. By way of illustration details concerning the EM algorithm can be found in a paper by Dempster and Laird entitled "Maximum likelihood from incomplete data via EM algorithm," published in Proc. of Royal Statistical Society, vol. B-39, pp. 1–38, 1977. Of course, the derivation of the algorithm for a given probability model is, in general, not trivial.

In deriving the M-step for our model, both forms of the deformation equations (4) and (5) are useful, depending on which parameters are being optimized. Using <> to denote an average over the training set, the update equations are:

$$P_{c,l} = \langle P(c, l|e_t = 0, g_t) \rangle \quad \text{(Eq. 22)}$$

$$\hat{\mu}_c = \langle \sum_i P(c, l|e_t = 0, \quad \text{(Eq. 23)}$$

$$g_t) E[T(a)^t \Psi_c^{-1} T(a)|c, l, e_t = 0, g_t] \rangle^{-1} \cdot \langle \sum_i P(c,$$

$$l|e_t = 0, g_t) E[T(a)^t \Psi_c^{-1} T(b) g_t | c, l, e_t = 0, g_t] \rangle$$

$$\hat{\Gamma}_l = \frac{\langle \sum_c P(c, l|e_t = 0, g_t) E\{\begin{bmatrix} a \\ b \end{bmatrix}[a' \ b']|c, l, e_t = 0, g_t\}\rangle}{\langle \sum_c P(c, l|e_t = 0, g_t)\rangle} \quad \text{(Eq. 24)}$$

$$\hat{\Psi}_c = diag \left( \frac{\langle \sum_l P(c, l|e_t = 0, g_t) E[(\tilde{f} - \tilde{g}_t) o (\tilde{f} - \tilde{g}_t)|c, l, e_t = 0, g_t]\rangle}{\langle \sum_c P(c, l|e_t = 0, g_t)\rangle} \right) \quad \text{(Eq. 25)}$$

The expectations needed to evaluate the above update equations are given by (E-step):

$$\Omega_{c,l} = cov\left\{\begin{bmatrix} a \\ b \end{bmatrix}|c, l, e_t = 0, g_t\right\} = (\Gamma_l^{-1} + M_c' \Psi_c^{-1} M_c)^{-1} \quad \text{(Eq. 26)}$$

$$\gamma_{c,l} = E\left\{\begin{bmatrix} a \\ b \end{bmatrix}|c, l, e_t = 0, g_t\right\} = \Omega_{c,l}^{-1} M_c' \Psi_c^{-1}(\mu_c - g_t) \quad \text{(Eq. 27)}$$

$$E\left\{\begin{bmatrix} a \\ b \end{bmatrix}[a' \ b']|c, l, e_t = 0, g_t\right\} = \Omega_{c,l} + \gamma_{c,l}\gamma_{c,l}' \quad \text{(Eq. 28)}$$

$$E[(\tilde{f} - \tilde{g}_t)?(\tilde{f} - \tilde{g}_t)|c, l, e_t = 0, g_t] = (\mu_c - g_t + M_c \gamma_{c,l})?(\mu_c - g_t + M_c \gamma_{c,l}) + diag(M_c(O_{c,l}) M ?_c) \quad \text{(E.q 29)}$$

Expectations in Eq. 23 may be computed using $$T(a)'\Psi_c^{-1}T(a) = \quad \text{(Eq. 30)}$$
$$\Psi_c^{-1} + \sum_{d \in (x,y)} G'_d diag(Ra_d)\Psi_c^{-1} + \sum_{d \in (x,y)} \Psi_c^{-1} diag(Ra_d) G_d +$$
$$\sum_{d_1, d_2 \in (x,y)} G'_{d_1} \Psi_c^{-1} diag(Ra_{d_1} a'_{d_2} R') G_{d_2}$$

$$T(a)'\Psi_c^{-1}T(b)g_t = \quad \text{(Eq. 31)}$$
$$\Psi_c^{-1} g_t + \sum_{d \in (x,y)} G'_d diag(Ra_d)\Psi_c^{-1} g_t + \sum_{d \in (x,y)} \Psi_c^{-1} diag(Rb_d) G_d g_t +$$
$$\sum_{d_1, d_2 \in (x,y)} G'_{d_1} \Psi_c^{-1} diag(Ra_{d_1} b'_{d_2} R') G_{d_2} g_t$$

Then, the expectations E[a] and E[b] are the two halves of the vector $\gamma_{c,l}$ given by Eq. 27, while $E[a_{d_1} a'_{d_2}]$ and $E[a_{d_1} b'_{d_2}]$, for $d_1, d_2 \in \{x, y\}$, are square blocks of the matrix in Eq. 28.

As noted before, the model is optimized by iterating E and M steps until some criterion of convergence is satisfied, such as small change in parameters or in joint likelihood of the data. An optimized model can then be used to evaluate the likelihood of a new observed pattern g, $p_m(e=0|g)$, where m denotes the particular model. If models for several classes of patterns have been trained on appropriate data, then ratios of these likelihoods indicate which models are better suited to the pattern. In particular, the pattern can be classified as belonging to the model with the largest likelihood, or a probability for each model can be assigned by normalizing the individual model likelihoods by their total sum.

The model can also be used for unsupervised learning. For example, if the data is not labeled, all classes of the data could be provided to the model, in which case one would hope that the clusters would correspond to different classes of the data, or at least that a single cluster does not provide examples similar to two different classes. Then, the clusters can be labeled appropriately after training.

Figure 5:
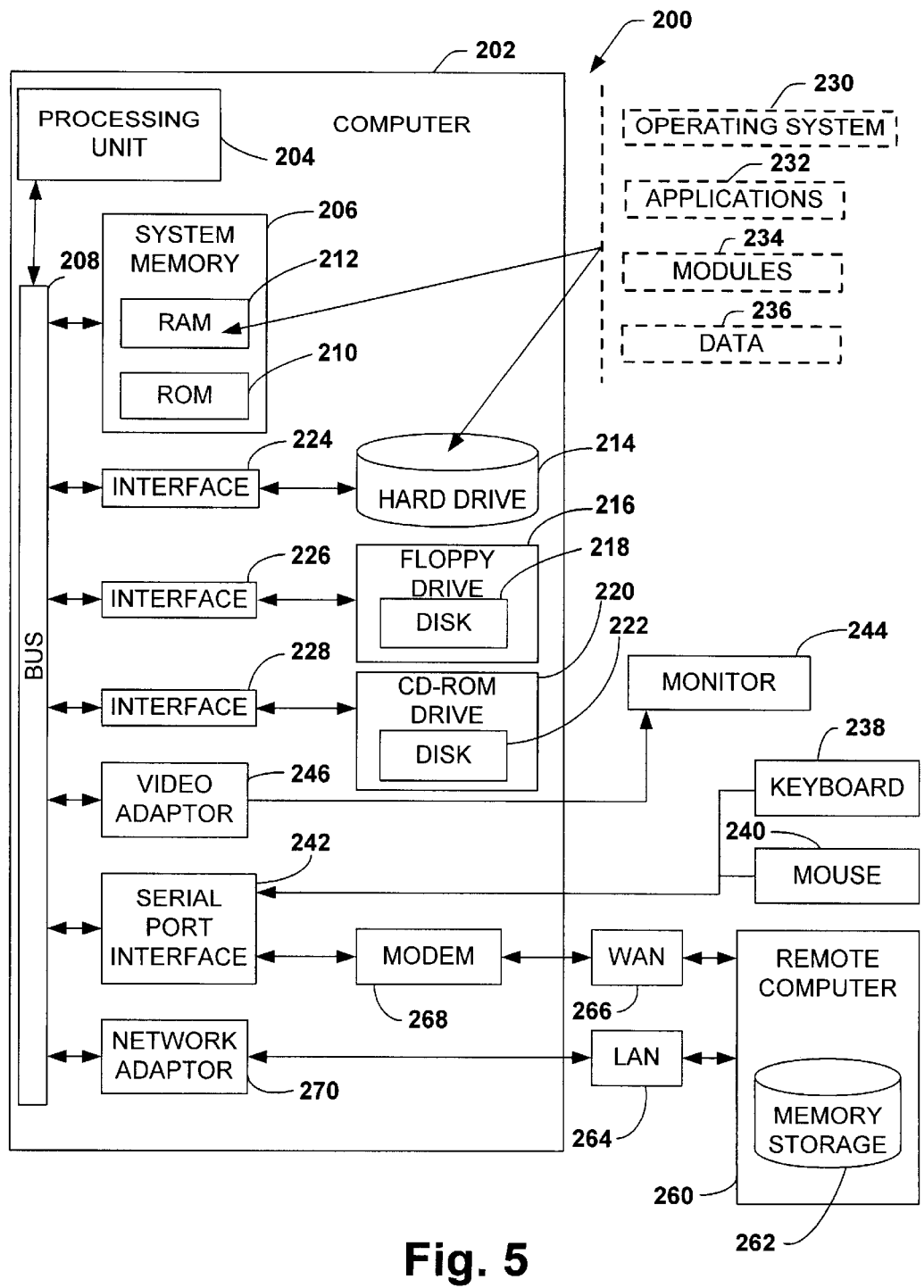
FIG. 5 is an example of an operating environment that may be employed to implement a process in accordance with the present invention.

In order to provide additional context for the various aspects of the present invention, FIG. 5 and the following discussion are intended to provide a brief, general description of a suitable computing environment 200 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in both local and remote memory storage devices.

With reference to FIG. 5, an exemplary system environment 200 for implementing the various aspects of the invention includes a conventional computer 202, including a processing unit 204, a system memory 206, and a system bus 208 that couples various system components including the system memory to the processing unit 204. The processing unit 204 may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also may be used as the processing unit 204.

The system bus 208 may be any of several types of bus structure including a memory bus or memory controller, a peripheral bus, and a local bus using any of a variety of conventional bus architectures such as PCI, VESA, Microchannel, ISA, and EISA, to name a few. The system 200 memory includes read only memory (ROM) 210 and random access memory (RAM) 212. A basic input/output system (BIOS), containing the basic routines that help to transfer information between elements within the computer 20, such as during start-up, is stored in ROM 210.

The computer 20 also may include, for example, a hard disk drive 214, a magnetic disk drive 216, e.g., to read from or write to a removable disk 218, and an optical disk drive 220, e.g., for reading a CD-ROM disk 222 or to read from or write to other optical media. The hard disk drive 214, magnetic disk drive 216, and optical disk drive 220 are connected to the system bus 208 by a hard disk drive interface 224, a magnetic disk drive interface 226, and an optical drive interface 228, respectively. The drives and their associated computer-readable media provide nonvolatile storage of data, data structures, computer-executable instructions, etc. for the computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment 200, and further that any such media may contain computer-executable instructions for performing the methods of the present invention.

A number of program modules may be stored in the drives and RAM 212, including an operating system 230, one or more application programs 232, other program modules 234, and program data 236. The operating system 230 in the illustrated computer is, for example, the "MICROSOFT WINDOWS NT®" operating system available from Microsoft Corporation, although it is to be appreciated that the present invention may be implemented with other operating systems or combinations of operating systems.

A user may enter commands and information into the computer 202 through one or more user input devices, such as a keyboard 238 and a pointing device (e.g., a mouse 240). Other input devices (not shown) may include a microphone, a joystick, a game pad, a satellite dish, a scanner, or the like. These and other input devices are often connected to the processing unit 204 through a serial port interface 242 that is coupled to the system bus 208, but may be connected by other interfaces, such as a parallel port, a game port or a universal serial bus (USB). A monitor 244 or other type of display device is also connected to the system bus 208 via an interface, such as a video adapter 246. In addition to the monitor, a computer typically includes other peripheral output devices (not shown), such as speakers, printers etc.

The computer 202 may operate in a networked environment using logical connections to one or more remote computers, such as a remote computer 260. The remote computer 260 may be a workstation, a server computer, a router, a peer device or other common network node, and typically includes many or all of the elements described relative to the computer 202, although, for purposes of brevity, only a memory storage device 262 is illustrated in FIG. 5. The logical connections depicted in FIG. 5 include a local area network (LAN) 264 and a wide area network (WAN) 266. Such networking environments are commonplace in offices, enterprise-wide computer networks, intranets and the Internet.

When used in a LAN networking environment, the computer 202 is connected to the local network 264 through a network interface or adapter 268. When used in a WAN networking environment, the computer 202 typically includes a modem 266, or is connected to a communications server on the LAN, or has other means for establishing communications over the WAN 266, such as the Internet. The modem 266, which may be internal or external, is connected to the system bus 208 via the serial port interface 242. In a networked environment, program modules depicted relative to the computer 202, or portions thereof, may be stored in the remote memory storage device 262. It will be appreciated that the network connections shown are exemplary and other means of establishing a communications link between the computers 202 and 260 may be used.

In accordance with the practices of persons skilled in the art of computer programming, the present invention has been described with reference to acts and symbolic representations of operations that are performed by a computer, such as the computer 202 or remote computer 260, unless otherwise indicated. Such acts and operations are sometimes referred to as being computer-executed. It will be appreciated that the acts and symbolically represented operations include the manipulation by the processing unit 204 of electrical signals representing data bits which causes a resulting transformation or reduction of the electrical signal representation, and the maintenance of data bits at memory locations in the memory system (including the system memory 206, hard drive 214, floppy disks 218, CD-ROM 222, and shared storage system 210) to thereby reconfigure or otherwise alter the computer system's operation, as well as other processing of signals. The memory locations where such data bits are maintained are physical locations that have particular electrical, magnetic, or optical properties corresponding to the data bits.

Figure 6:
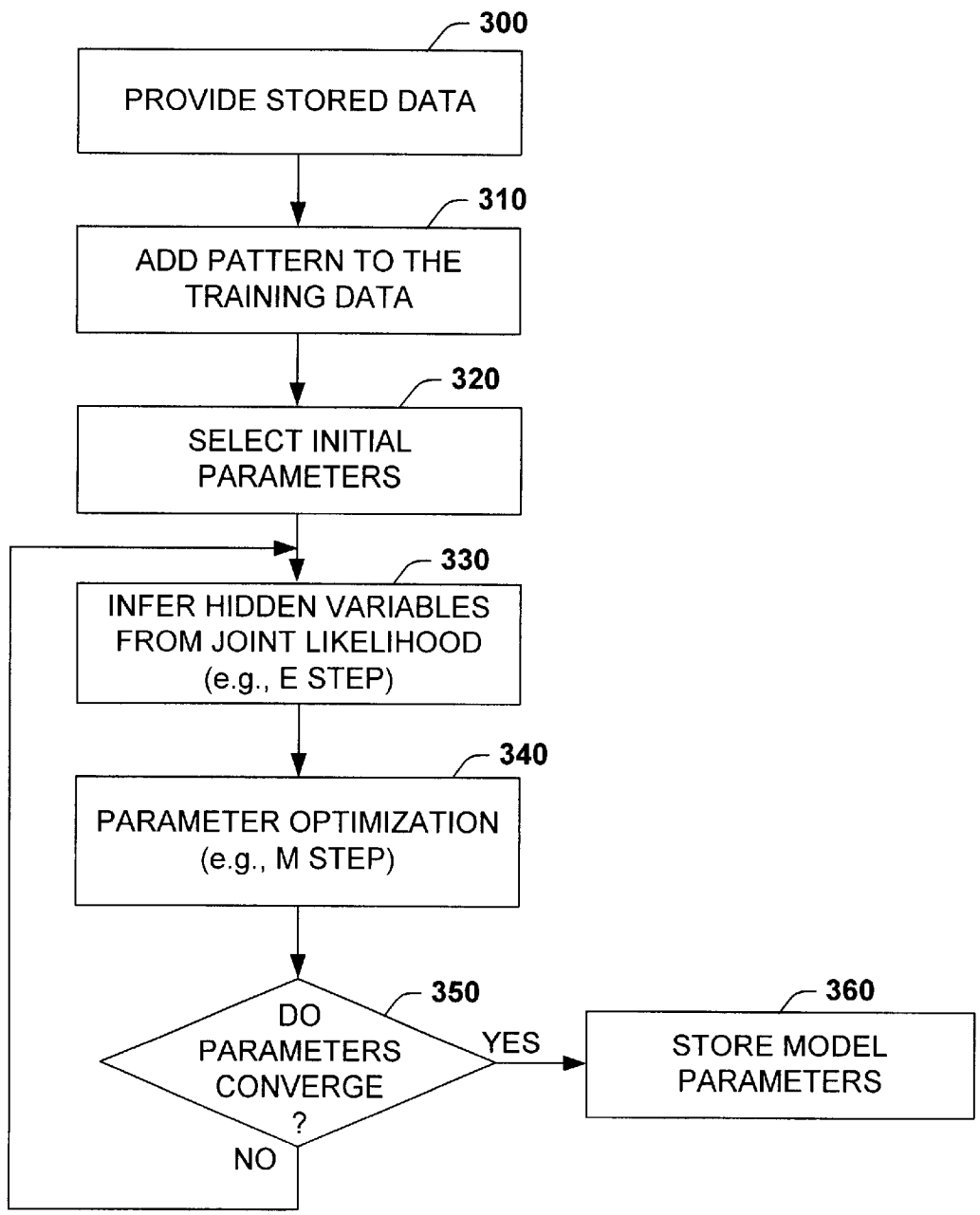
FIG. 6 is a flow diagram illustrating a methodology for optimizing a model and deriving a measure of similarity between patterns in accordance with the present invention.

In view of the operating environment, algorithms and models shown and described herein, a methodology, such as may be implemented in accordance with the present invention on a computer, will be better appreciated with reference to the flow diagrams of FIG. 6. While, for purposes of explanation, the methodology is shown and described as a series of blocks with respect to a flow diagram illustrating acts and/or events in connection with the present invention. It is to be understood and appreciated that the present invention is not limited by the number and/or order of blocks, as some acts may, in accordance with the present invention, occur in different orders and/or concurrently with other acts from that shown and described herein. Moreover, not all illustrated acts may be required to implement a methodology in accordance with the present invention.

Turning now to FIG. 6, the methodology begins at act 300 in which a stored data set is provided,.based on which a model is to be trained, including learning model parameters, in accordance with an aspect of the present invention. In accordance with an aspect of the present invention, the model parameters govern the probability distributions for the model and a number of intermediate, hidden variables that are not observed in real applications (such as the deformation coefficients). As mentioned above, the deformation field may be constructed from wavelet basis vectors and associated low-frequency deformation coefficients. The functional form of the probability distribution for the deformation coefficients may be known, but the exact coefficients for each pattern typically are not known and thus may need to be determined.

Next, at act 310 a test pattern is added to the stored data. The test pattern corresponds to a pattern for which the model parameters are to be learned from the stored data set. From act 310, the methodology proceeds to act 320 to begin optimizing (or training) a model according to the stored data, including the test pattern.

The optimization process, for example, may include the previously described EM algorithm or its on-line version (that updates the model parameters with each new pattern added to the database) or another optimization technique. The goal of an optimization process is to optimize the associated parameters based on the stored data, in accordance with an aspect of the present invention. While the following acts relate generally to an EM approach to optimize the unknown parameters, those skilled in the art will understand and appreciate that other optimization techniques also could be used to determine the model parameters in accordance with an aspect of the present invention.

At act 320, initial parameters of the model are selected for performing the optimization. The initial parameters may be selected arbitrarily or in a way that is expected to speed up the algorithm (e.g., based on the mean and variance of the training data). Also, the initial values of the hidden variables used to infer the parameters may be based on previous applications of the model. The methodology then proceeds to act 330, in which the parameters from act 320 are employed to infer (or estimate) the hidden variables assuming that the error pattern is equal to zero. The inference of the hidden variables (act 330) corresponds to the above described expectation act, which estimates the distribution over the hidden variables assuming that the current guess at the model parameters is correct. Appropriate equations for computing expectations, in accordance with an aspect of the present invention are provided by Eq. 30 and Eq. 31. Then, assuming now that the result of inference is correct, the process proceeds to act 340 in which the parameters are updated using the maximization act (see, e.g., Eq. 23–Eq. 25).The process then proceeds to act 350.

At act 350, a determination is made as to whether the previous and current estimated parameters substantially converge. If the parameters have not substantially converged, the methodology returns to act 330 for repeating the E step and the M step of the EM algorithm. This iterative process may repeat until it is determined that the parameters substantially converge (act 350). If the parameters do converge, from act 350, the methodology may then proceed to act 360 in which the model parameters are stored. The stored model parameters define an optimized model having model parameters that characterizes a group of patterns to which the test pattern belongs.

The above description is based on batch learning. For example, if a new, previously unseen pattern is added to the training data, the model is retrained based on the whole dataset. However, those skilled in the art will recognize that it is also straightforward to utilize the methodology, in accordance with an aspect of the present invention, in situations when data is coming in incrementally, such as may be implemented as an on-line version of the methodology, including an appropriate EM algorithm. It is to be appreciated that an on-line version of the EM algorithm may be programmed to compute the effects of the new data on the previously learned parameters, with an appropriate forgetting factor. Accordingly, the on-line version does not retrain on the whole set, thus reducing the accuracy, but increasing the speed.

As mentioned above, an optimized model can be used to evaluate the likelihood that a new observed pattern belongs to a particular model. That is, similar models could be trained for each class of pattern of interest according to the methodology of FIG. 6. Once models for several classes of patterns have been trained on appropriate data, for example, then ratios of these likelihoods may be employed to indicate which models are better suited to the pattern. In particular, the pattern can be classified as belonging to the model with the largest likelihood, or a probability for each model can be assigned by normalizing the individual model likelihoods by their total sum.

Figure 7:
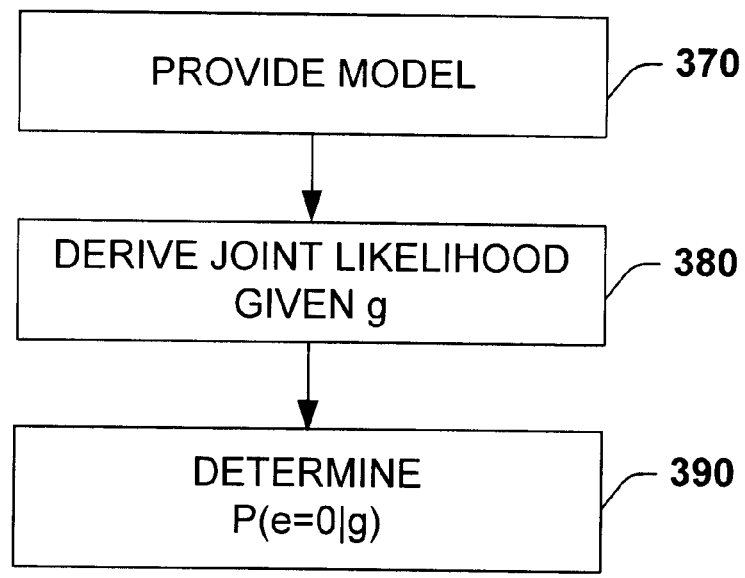
FIG. 7 is a flow diagram illustrating a methodology for deriving a measure of similarity between patterns in accordance with the present invention.

FIG. 7 illustrates an example of a process that may be employed to classify a test pattern g in accordance with an aspect of the present invention. The methodology begins at act 370 in which a generative model, in accordance with an aspect of the present invention, is provided. The model, for example, may represent how an error pattern is derived from a pair of patterns, one or both of which may be deformed, such as shown and described with respect to FIG. 1.

For example, each pattern may be selected from a Gaussian distribution of patterns. In accordance with an aspect of the present invention, the model includes a plurality of parameters that govern the probability distributions for the model and a number of intermediate, hidden variables that are not observed in real applications (such as the deformation coefficients). The model parameters, for example, may have been derived according to the methodology of FIG. 6, although other parameter optimization techniques could be utilized to derive appropriate model parameters. As mentioned above, the deformation field may be constructed from wavelet basis vectors and associated low-frequency deformation coefficients. From act 370, the methodology then proceeds to act 380.

At act 380, a joint likelihood of all the variables in the model, given the test pattern g, is derived assuming that the error pattern of the model equals zero, such as expressed with respect to Eq. 17. Next at act 390, the joint likelihood that the error pattern equals zero, given the observed pattern g, may be employed to classify new patterns in accordance with an aspect of the present invention. The likelihood value is computed by averaging over the hidden variables, taking the dependencies among the variables into account. In essence, this produces a likelihood value as to whether the first pattern is in accordance with the model, and this likelihood value may then be employed in classification by evaluating models for different classes of patterns.

This is in contrast with finding an optimum level of deformation, which may be determined by minimizing a deformation-invariant distance between two patterns. The estimated parameters of the model serve to properly regularize the distance among patterns, and the integration technique rewards the patterns that are easier to reach with the generative model. For example, if an observed pattern is close to several prototype patterns, a likelihood computation according to the present invention will naturally reward such a pattern with greater likelihood than if the observed pattern is only remotely similar to one of the prototypes.

Figure 8:
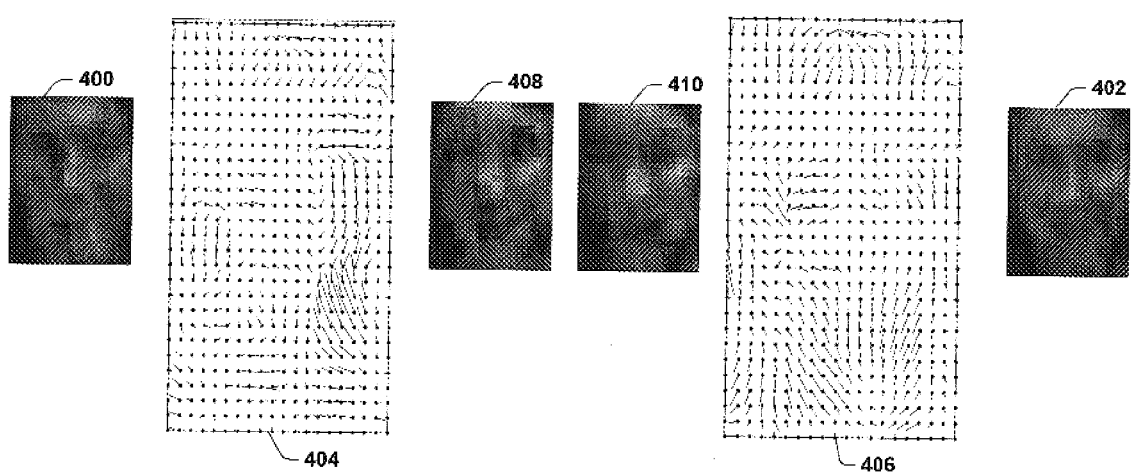
FIG. 8 illustrates an example of experimental results obtained in accordance with the present invention.

To verify the efficacy of the foregoing methodology, the algorithm, in accordance with an aspect of the present invention, was applied to 20×28 grayscale images of people with different facial expressions and 8×8 grayscale images of handwritten digits from the CEDAR CDROM (Hull, 1994). FIG. 8 illustrates an example in which deformation fields have been estimated for matching two images 400 and 402 of a face of the same person but with different facial expressions. In this example, deformation fields 404 and 406 have been derived from application of the algorithm to the image patterns 400 and 402, respectively. The deformation fields 404 and 406 operate on the image patterns 400 and 402 to produce respective deformed images 408 and 410. In this case, the ? matrix has been set to identity and the matrix ? has been set by hand to allow a couple of pixels of deformations.

To compare the method of the present invention with other generative models, a training set of 2000 images was used to learn 10 digit models using the EM algorithm and tested the algorithms in a test set of 1000 digit images.

It has been determined that a mixture of diagonal Gaussians (MDG) requires about 10–20 classes per digit to achieve an optimal error rate of only about 8% on the handwritten digit recognition task. See, e.g., Estimating mixture models of images and inferring spatial transformations using the EM algorithm; B. Frey and N. Jojic, *Proceedings of the IEEE Conference on Computer Vision and Pattern Recognition,* Ft. Collins, Colorado, IEEE Computer Society Press, Los Alamitos, Calif. (1999). It is to be appreciated that the network, in accordance with the present invention, reduces to MDG when ? is set to zero.

It will be understood and appreciated by those skilled in the art that a deformable image matching network, in accordance with the present invention, could be used for a variety of computer vision tasks such as optical flow estimation, deformation invariant recognition and modeling correlations in deformations. For example, our learning algorithm could learn to jointly deform the mouth and eyes when modeling facial expressions. It further will be appreciated that it further may be extended to applications with non-image based pattern matching or recognition processes, such as audio, electromagnetic, etc.

What has been described above includes examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Furthermore, to the extent that the term "includes" and variants thereof or the term "having" and variants thereof are used in either the detailed description or the claims, such terms are intended to be inclusive in a manner similar to the term "comprising."

What is claimed is:

1. A method for learning mixtures of models to facilitate pattern recognition comprising:

provideing a model having model parameters, the model characterizing an error pattern functionally related to a difference between two patterns, at least a first of the two patterns being deformed by application of an associated substantially smooth and non-uniform deformation field;

deriving a likelihood in the model relative to the model parameters, given a stored pattern, assuming that the error pattern equals zero; and estimating the model parameters that substantially maximize the likelihood for a plurality of stored patterns.

2. The method of claim 1, further comprising determining a likelihood of observing a zero error pattern for one of the two patterns, given the other of the two patterns, based on the estimated model parameters.

3. The method of claim 2, wherein the act of determining further comprises averaging over intermediate variables in the model to determine the likelihood of observing a zero error pattern, given the stored pattern.

4. The method of claim 3, wherein the intermediate variables include deformation coefficients of the deformation field.

5. The method of claim 1, further comprising optimizing the model as a function of at least one model parameter relative to the likelihood.

6. The method of claim 5, wherein the model further comprises intermediate variables, the act of optimizing further comprising:
 inferring the intermediate variables based on the estimated model parameters;
 optimizing the model parameters based on the inferred intermediate variables; and
 repeating the acts of inferring and optimizing until the model parameters substantially converge.

7. The method of claim 1 wherein the deformation field associated with the first pattern includes deformation coefficients that are applied to functional basis vectors to form the deformation field, the deformation coefficients control correlation among deformation in different parts of the first pattern.

8. The method of claim 1, wherein each of the two patterns are deformed by application of an associated substantially smooth and non-uniform deformation field.

9. The method of claim 8, wherein the model further comprises intermediate variables that control deformations in each of the two patterns.

10. The method of claim 9, wherein the intermediate variables include first and second deformation coefficients that are applied to functional basis vectors to form the deformation fields for each of the respective two patterns in the model.

11. The method of claim 10, wherein the first deformation coefficients control correlation among deformation in different parts of the first pattern and the second deformation coefficients control correlation among deformation in different parts of a second of the two patterns.

12. The method of claim 10, wherein the first and second deformation coefficients are correlated based on one of the model parameters.

13. The method of claim 9, wherein the first pattern has a pattern variance parameter that imposes class dependent noise into the model.

14. The method of claim 9, wherein the error pattern has at least one pattern variance parameter operative to scale the importance of various parts of each pattern in computing a distance measure between the two patterns.

15. The method of claim 1, further comprising creating a plurality of models, each of the plurality models having optimized model parameters that have been estimated for a respective class of patterns.

16. The method of claim 15, further comprising employing the estimated parameters to classify an observed pattern according to which of the plurality of models the observed pattern exhibits the highest likelihood for the observed pattern.

17. A computer-readable medium having computer-executable instructions for:

providing a model having initial model parameters, the model characterizing an error pattern functionally related to a difference between two patterns, at least a first of the two patterns being deformed by application of an associated substantially smooth and non-uniform deformation field;

deriving a likelihood in the model relative to the model parameters, given a stored pattern, assuming that the error pattern equals zero; and estimating the model parameters that substantially maximize the likelihood for a plurality of stored patterns.

18. A method for generating a model to facilitate pattern recognition, comprising:

modeling an error pattern based on a first pattern relative to a second pattern, at least the first pattern being deformed by application of a substantially smooth deformation field, the model having at least one parameter for characterizing a set of pattern prototypes and associated noise levels and for controlling deformation of the first pattern;

characterizing a likelihood that an error pattern is zero, given the second pattern, the error pattern being functionally related to the first pattern, the second pattern, and the at least one parameter; and estimating the at least one parameter that tends to maximize the likelihood for a plurality of stored second patterns.

19. The method of claim 18, further comprising repeating the acts of characterizing and estimating for the plurality of stored second patterns, so as to optimize the at least one parameter according to the stored patterns.

20. The method of claim 18, wherein the deformation field associated with the first pattern is a first deformation field, the second pattern being deformed by application of a second substantially smooth deformation field, the at least one parameter characterizing a set of pattern prototypes and associated noise levels and for controlling deformation of the first and second patterns.

21. The method of claim 20, wherein the first and second deformation fields have respective deformation coefficients that are correlated according to a covariance matrix which is a parameter of the model.

22. The method of claim 20, wherein the first pattern has at least one pattern variance parameter that imposes class dependent noise into the model.

23. The method of claim 20 wherein the error pattern has at least one pattern variance parameter to facilitate scaling of the importance of the selected parts of each of the first and second patterns in computing the distance measure.

24. The method of claim 18, further comprising determining a likelihood of observing a zero error pattern, given the second pattern, based on the estimated model parameter relative to the first pattern.

25. The method of claim 24, wherein the act of determining further comprises averaging over intermediate variables of the model to determine the likelihood of observing a zero error pattern, given the stored pattern.

26. The method of claim 25, wherein the intermediate variables comprise deformation coefficients that form part of the deformation field.

27. The method of claim 18, further comprising optimizing the model as a function of the at least one model parameter relative to the likelihood.

28. The method of claim 27, wherein the model further comprises intermediate variables, the act of optimizing further comprising:

inferring the intermediate variables based on the at least one estimated model parameter;

training the at least one model parameter based on the inferred intermediate variables; and repeating the acts of inferring and training until the at least one model parameter substantially converges.

29. The method of claim 28, wherein the intermediate variables comprise deformation coefficients that form part of the deformation field.

30. The method of claim 18, wherein the method further comprises creating a plurality of models, each of the plurality models having model parameters optimized for a respective class of patterns.

31. The method of claim 30, further comprising employing the plurality of models to classify an observed pattern according to which of the plurality of models the observed pattern exhibits the highest likelihood for the observed pattern.

32. A computer-readable medium having computer-executable instructions for:

modeling an error pattern based on a first pattern relative to a second pattern, at least the first pattern being deformed by application of a substantially smooth deformation field, the model having at least one parameter for characterizing a set of pattern prototypes and associated noise levels and for controlling deformation of the first pattern;

characterizing a likelihood that an error pattern is zero, given the second pattern, the error pattern being functionally related to the first pattern, the second pattern, and the at least one parameter; and estimating the at least one parameter that tends to maximize the likelihood for a plurality of stored second patterns.

* * * * *